United States Patent [19]

Shirodkar

[11] Patent Number: 4,921,911

[45] Date of Patent: May 1, 1990

[54] BLENDS OF LINEAR LOW DENSITY ETHYLENE COPOLYMERS

[75] Inventor: Pradeep P. Shirodkar, Somerset, N.J.

[73] Assignee: Mobil Oil Corporation, New York, N.Y.

[21] Appl. No.: 384,361

[22] Filed: Jul. 25, 1989

Related U.S. Application Data

[63] Continuation-in-part of Ser. No. 266,957, Nov. 3, 1988, and a continuation-in-part of Ser. No. 295,430, Jan. 10, 1989.

[51] Int. Cl.$^5$ .................... C08L 23/18; C08L 23/20; C08L 51/04
[52] U.S. Cl. .................................... 525/86; 525/233; 525/240
[58] Field of Search .................... 525/240, 86, 233

[56] References Cited

U.S. PATENT DOCUMENTS 3,660,530  5/1972  Hoblit et al. .
4,430,647  2/1984  Liu .
4,456,606  6/1984  Columbo .
4,565,847  1/1986  Bahl et al. .
4,579,912  4/1986  Canterino et al. .
4,657,982  4/1987  Breck et al. .

FOREIGN PATENT DOCUMENTS 63726  6/1978  Romania .

OTHER PUBLICATIONS

Kirk–Othmer, Encyclopedia of Chemical Technology, 3rd Ed., vol. 1, Wiley–Interscience 1981, pp. 442 to 445.
Hawley, Condensed Chemical Dictionary, 10th Ed., Van Nostrand Reinhold, 1981, p. 3.

Primary Examiner—Carman J. Seccuro
Attorney, Agent, or Firm—Alexander J. McKillop; Charles J. Speciale

[57]  ABSTRACT

Novel polymer blends are provided comprising a linear low density copolymer of ethylene with an olefin containing 4 to 10 carbon atoms (LLDPE) compounded with minor amounts of an at least partially isotactic, partially crystalline butene-1 polymer comprising at least about 80 wt. % of polymerized butene-1, and an ABS resin. The blends can be fabricated with better processability into blown films having improved impact and MD tear resistance properties.

16 Claims, No Drawings

BLENDS OF LINEAR LOW DENSITY ETHYLENE COPOLYMERS

CROSS-REFERENCED TO RELATED APPLICATIONS

This application is a continuation-in-part of applications Ser. No. 266,957, filed Nov. 3, 1988 and a continuation-in-part of Ser. No. 295,430, filed Jan. 10, 1989.

BACKGROUND OF THE INVENTION

1. Field of the Invention

This invention relates to novel compositions comprising a linear low density copolymer of ethylene and a minor amount of an olefin containing 4 to 10 carbon atoms (LLDPE), and to films of improved properties formed from such compositions. Also included in the invention is the process of forming blown films from such compositions which is accomplished with improved processability.

2. Description of Related Art

The following information is disclosed in accordance with the terms of 37 CFR 1.56, 1.97 and 1.98.

U.S. Pat. No. 4,565,847, issued Jan. 21, 1986 to S. K. Bahl et al., discloses blends of LLDPE, polypropylene (PP) or ethylene-propoylene copolymer, and ethylene-propylene-diene monomer rubber (EPDM), which are stated to form films having improved MD tear strength and dart drop impact properties.

U.S. Pat. No. 4,579,912, issued Apr. 1, 1986 to P. J. Canterino et al., teaches blends of LLDPE and an aromatic polymer, e.g., polystyrene, which are stated to form films of improved MD tear strength and higher stiffness compared to LLDPE alone.

U.S. Pat. No. 4,657,982, issued Apr. 14, 1986 to A. K. Breck et al., discloses film-forming blends of a linear copolymer of ethylene and a $C_4$ to $C_8$ alpha-olefin, and two "polybutenes," one having a number average molecular weight of 500 to 1500 and the other a number average molecular weight of 1700 to 10,000.

U.S. Pat. No. 4,456,660, issued June 26, 1984 to E. A. Columbo, teaches blends of conventional branched low density polyethylene (LDPE) and polybutene-1 used to prepare laminated films with unblended LPDE which are stated to be tough and to have good tear resistance.

U.S. Pat. No. 3,660,530 issued May 2, 1972 to Hoblit et al., discloses blends of high density polyethylene and block copolymers of polyethylene and a polymer of butene-1 which are stated to have improved stress crack resistance.

U.S. Pat. No. 4,430,476, issued Feb. 7, 1984 to Liu, discloses the improvement of the impact resistance and ductility of notched polycarbonate resin articles by blending the polycarbonate with varying amounts of an alkenyl aromatic copolymer, e.g., an ABS resin, and an LLDPE.

Romanian Patent No. 63,726 of Petraru et al., published June 30, 1978 [abstracted in C.A. 91(24)194203r] discloses blends of 100 parts of low density polyethylene, 2 to 20 parts of the ABS copolymer, and 10 to 15 parts of carbon black extruded into films with transverse and longitudinal tensile strengths of 160 and 151 kg/cm², tear strength of 86 and 84 kg/cm², and breaking elongations of 640 and 660% respectively.

Kirk-Othmer, *Encyclopedia of Chemical Technology*, Third Edition, Vol. 1., Wiley-Interscience, 1981, pages 442 to 445, and Hawley, *Condensed Chemical Dictionary*, Tenth Edition, Van Nostrand Reinhold, 1981, page 3, describe typical ABS resins contemplated under this invention.

Pending parent application Ser. No. 266,957, filed Nov. 3, 1988 discloses and claims blends of LLDPE and a minor amount of a butene-1 polymer which can be formed into films having improved impact properties.

Pending parent application Serial No. 295,430, filed Jan. 10, 1989 discloses and claims blends of LLDPE and a minor amount of an ABS resin which can be formed into films having improved antiblocking, impact and MD tear resistance properties.

SUMMARY OF THE INVENTION

In accordance with this invention, novel polymer blends are provided comprising a major amount of a linear low density copolymer of ethylene with an olefin containing 4 to 10 carbon atoms (LLDPE), compounded with minor amounts of an at least partially isotactic, partially crystalline butene-1 polymer comprising at least about 80 wt. % of polymerized butene-1, and an "ABS resin" as the latter term is understood in the art and as defined hereinafter, based on the total polymer content of the blend. The blends can be fabricated with better processability into blown films having improved impact and MD tear resistance properties.

DESCRIPTION OF PREFERRED EMBODIMENTS

The linear low density ethylene copolymers (LLDPE) of this invention are linear copolymers of ethylene and a minor amount, preferably about 2 to 10 wt. %, of an olefin, preferably a 1-olefin, containing 4 to 10 carbon atoms and having a density of about 0.9 to 0.94, a melting point of about 110° to 130° C., and a melt index of about 0.2 to 10. The preferred olefin comonomers are 1-butene, 1-hexene and 1-octene. The LLDPE may be prepared by any of various methods known in the art, e.g., by relatively low pressure methods as disclosed, for example, in U.S. Pat. No. 4,076,698, or by relatively high pressure methods, as disclosed, for example, in U.S. Pat. Nos. 4,405,774 and 4,530,983.

The butene-1 polymers contemplated under this invention are at least partially isotactic, partially crystalline polymers comprising at least 80 wt. %, preferably at least 90 wt. % of polymerized butene-1. These polymers include homopolymers of butene-1 and copolymers of at least about 80 wt. % of butene-1 and up to about 20 wt. % of at least one polymerized comonomer, e.g., an olefin, preferably a 1-olefin, containing 2 to about 10 carbon atoms, and preferably have a number average molecular weight of at least about 25,000, a density of from about 0.890 to 0.920, and a melt index of from about 0.1 to 40, (ASTM condition E). Some of these polymers are described in the article on "Polymers of Higher Olefins" in Kirk-Othmer, *Encyclopedia of Chemical Technology*, Third Edition, Wiley-Interscience, 1981, pages 470–477. The polymers may be prepared using a Ziegler-Natta type catalyst as described for example in U.S. Pat. No. 3,362,940 or the foregoing Kirk-Othmer article. In general, the butene-1 polymers in unblended form are capable of being formed into shaped articles such as films.

The "ABS resin" contemplated under this invention comprises a rubbery or elastomeric butadiene polymer dispersed in a rigid or glassy styrene-acrylonitrile copolymer matrix. Preferably, the rubbery butadiene polymer contains, at various points along its backbone, grafted segments of styrene-acrylonitrile copolymer, which have the effect of improving compatability between the two polymer phases. Also contemplated within the term "ABS resin" are physical blends of a rubbery butadiene polymer containing no grafted polymer segments dispersed in a rigid styrene-acrylonitrile copolymer phase. Generally, there is some degree of cross-linking within the rubbery butadiene polymer phase.

The rubbery butadiene polymer independent of any grafted polymer segments which may be present, usually contains at least about 60 wt. % of polymerized butadiene. Some examples of these polymers are polybutadiene (a butadiene homopolymer), and copolymers of butadiene and acrylonitrile and/or styrene. The rubbery butadiene polymer may be present, for example, in an amount of about 10 to 30 wt. % of the total polymer content of the ABS resin, and the overall amounts of polymerized acrylonitrile, butadiene, and styrene in the ABS resin are within the weight percent ranges of about 15–25:5–25:80–30, respectively, preferably about 15–22-:7–40:78–38.

The ABS resins contemplated under the invention may have, for example, a 3.2 mm notched Izod impact strength at 23° C. of about 2 to 12 ft-lb/in (ASTM D256), a tensile strength at 23° C. of about 4800 to 7500 psi (ASTM D638), a tensile modulus at 23° C. of about 2.5 to $3.8 \times 10^5$ psi (ASTM D638), a Rockwell hardness at 23° C. of about 88 to 110 HRC (ASTM D785), a specific gravity at 23° C. of about 1.02 to 1.06 (ASTM D792), a thermal deflection temperature of annealed samples at 264 psi of about 93° to 112° C. (ASTM D648), and a linear coefficient of thermal expansion of 6.5 to $11.0 \times 10^{-5}$ cm/cm/°C. (ASTM D696). Some suitable ABS resins for use in the compositions and processes of this invention are described in the previously cited Kirk-Othmer and Hawley references, the entire disclosures of which are incorporated by reference.

The blends of LLDPE, butene-1 polymer, and ABS resin may be prepared using any of various methods known in the art. For example, pellets of the three polymers may be dry blended and the blend added directly to a blown film extruder, e.g., a Sterling extruder, to produce films having a thickness, for example, of about 0.5 to 5 mils.

The polymer blends of this invention contain a major amount, i.e., over 50 wt. % of the LLDPE and a minor amount, i.e., under 50 wt. % of the combination of butene-1 polymer and ABS resin based on the total polymer content. Preferably, the blend contains about 1 to 20 wt. % each, more preferably, about 1 to 10 wt. % each of the butene-1 polymer and ABS resin, based on the total polymer content. Moreover, the polymer content of the blend preferably consists of the LLDPE, butene-1 polymer, and ABS resin. In addition to the polymer components, the blend may also contain any of various additives conventionally added to polymer compositions for different purposes, e.g., antiblocking agents such as microtalc, stabilizers, compatibilizers, pigments, etc.

The following examples further illustrate the invention.

COMPARATIVE EXAMPLES A TO F AND EXAMPLES 1 AND 2

Films of 1.0 and 1.5 mils nominal gauge thickness were prepared from a first lot of Mobil NTA-101 LLDPE, which is a linear low density copolymer of ethylene and about 6 wt. % of 1-hexene having a density of about 0.918, a melting point of about 125° C. and a melt index of about 1, blended with 5000 ppm of microtalc as an antiblocking agent (Comparative Examples A and B); the foregoing LLDPE blended with 5 wt. % of Shell PBO400 polybutene-1 (a butene-1 homopolymer) having a density of about 0.915, a melt index of about 20, and a number average molecular weight of about 40,000, and 5,000 ppm of microtalc (Examples C and D); the foregoing LLDPE blended with 5 wt. % of Cycolac DFA-R1000 medium impact ABS resin manufactured by Borg-Warner Chemicals, Inc. and containing 20 wt. % of acrylonitrile, 10 wt. % of butadiene, and 70 wt. % of styrene, as determined by $^{13}C$ NMR, and having a notched Izod impact strength at 23° C. of about 4.0 ft-lb/in, a tensile strength at 23° C. of about 6,200 psi, a tensile modulus at 23° C. of about $3.4 \times 10^5$ psi, a Rockwell hardness at 23° C. of about 108 HRC, a specific gravity at 23° C. of about 1.04, a thermal deflection temperature of annealed samples at 264 psi of about 94° C., and a linear coefficient of thermal expansion of about $8.8 \times 10^{-5}$ cm/cm/°C., using the ASTM test methods identified previously (Examples E and F); and the foregoing LLDPE blended with 5 wt. % of the foregoing polybutene-1 and 5 wt. % of the foregoing ABS (Examples 1 and 2).

The polymer blends of these examples were prepared by dry blending the polymer pellets and the microtalc powder where used, and the wt. % of polybutene-1 and ABS resin in these blends was based on the combined weight of the total polymers present.

The films were made in a 2½ inch Sterling blown film extruder under the following fabrication conditions: BUR (blow up ratio) of 2.5; production rate of 150 lb/hr; die gap of 80 mils; and a 6 inch die.

Table I shows the screw tip pressure and screw amperes at which the extruder operated, and the Induced Blocking Force (ASTM D3354), MD tear (ASTM D1922), Spencer Impact (ASTM D3420), and Dart Drop $F_{50}$ Impact (ASTM D1709), of the films prepared in these examples.

TABLE I

| Example | Screw Tip Press. psig. | Screw Amperes | Nominal Gauge mils | Induced Blocking gms | MD Tear g/mils | Spencer Impact gms/mil | Dart Drop $F_{50}$ gms |
|---|---|---|---|---|---|---|---|
| A | 3090 | 46 | 1.0 | 85.1 | 335 | 763 | 175 |
| B | 3090 | 46 | 1.5 | 75.6 | 388 | 633 | 238 |
| C | 2680 | 29.5 | 1.0 | 63.0 | 405 | 1770 | 210 |
| D | 2680 | 29.5 | 1.5 | 40.0 | 510 | 924 | 256 |
| E | 2810 | 42 | 1.0 | 74.5 | 435 | 1860 | 336 |
| F | 2810 | 42 | 1.5 | 84.9 | 487 | 1340 | 404 |
| 1 | 2470 | 30 | 1.0 | 82 | 522 | 2030 | 248 |

TABLE I-continued

| Example | Screw Tip Press. psig. | Screw Amperes | Nominal Gauge mils | Induced Blocking gms | MD Tear g/mils | Spencer Impact gms/mil | Dart Drop F$_{50}$ gms |
|---|---|---|---|---|---|---|---|
| 2 | 2470 | 30 | 1.5 | 75.2 | 592 | 1640 | 360 |

EXAMPLES G, H AND 3

In these examples, films of 1.0 mil nominal gauge thickness were prepared from a second lot of Mobil NTA-101 LLDPE which had been premixed with 5000 ppm of microtalc (Example G); the same premixed LLDPE blended with 5 wt. % of the same polybutene-1 as that employed in Examples C, D, 1 and 2 (Example H); and the same premixed LLDPE blended with 5 wt. % of the same polybutene-1 as previously employed and the same ABS resin as employed in Examples E, F, 1 and 2 (Example 3). The same procedures as those utilized in the previous examples were employed in preparing the polymer blends and films and in determining the properties of the films. The results are shown in Table II.

TABLE II

| Example | Screw Tip Press. psig. | Screw Amperes | Induced Blocking gms | MD Tear g/mils | Dart Drop F$_{50}$ gms |
|---|---|---|---|---|---|
| G | 2690 | 42 | 68 | 277 | 144 |
| H | 2640 | 30 | 47 | 279 | 163 |
| 3 | 2390 | 28.5 | 21 | 412 | 254 |

The results shown in Tables I and II indicate that improved MD Tear and Spencer Impact properties were obtained with the films containing both polybutene-1 and ABS (Examples 1 to 3) as compared with films of equal thickness containing no polybutene-1 or ABS or containing only one of these polymer additions (Examples A to H) whether or not a microtalc antiblocking agent was also present. The results also indicate that better Dart Drop Impact properties and, when microtalc was present in the films, better Induced Blocking properties were obtained when the films contained both polybutene-1 and ABS than when the films contained neither of these polymer additives or only polybutene-1.

Finally, the results show that these properties were accompanied by a superiority of processability in producing the films of Examples 1 to 3 containing both polybutene-1 and ABS as compared with the films of Comparative Examples A to H containing neither or only one of these polymer additives, as indicated by lower values of screw tip pressure and screw amperes.

I claim:

1. A polymer blend comprising a linear low density copolymer of ethylene with an olefin containing 4 to 10 carbon atoms and minor amounts of an at least partially isotactic, partially crystalline butene-1 polymer comprising at least about 80 wt. % of polymerized butene-1, and an ABS resin, based on the total polymer content of the blend.
2. The blend of claim 1 wherein said ethylene copolymer contains about 2 to 10 wt. % of said olefin in polymerized form.
3. The blend of claim 1 wherein said olefin is a 1-olefin.
4. The blend of claim 3 wherein said 1-olefin is 1-butene, 1-hexene, or 1-octene.
5. The blend of claim 1 wherein said ethylene copolymer has a density of about 0.9 to 0.94, a melting point of about 110° to 130° C., and a melt index of about 0.2 to 10.
6. The blend of claim 1 wherein said butene-1 polymer has a number average molecular weight of at least about 25,000.
7. The blend of claim 6 wherein said butene-1 polymer is a homopolymer of butene-1.
8. The blend of claim 6 wherein said butene-1 polymer is a copolymer of butene-1 and ethylene.
9. The blend of claim 1 wherein said butene-1 polymer has a density of from about 0.890 to 0.920 and a melt index of from about 0.1 to 40.
10. The blend of claim 1 containing about 1 to 20 wt. % each of said butene-1 polymer and ABS resin, based on the weight of the total polymer content.
11. The blend of claim 10 wherein said butene-1 polymer and ABS resin are present each in an amount of 1 to 10 wt. % based on the weight of the total polymer content.
12. The blend of claim 1 in which the polymers present consist of said low density copolymer of ethylene, butene-1 polymer and ABS resin.
13. A film composed of the blend of claim 1.
14. A film composed of the blend of claim 4.
15. A film composed of the blend of claim 11.
16. A film composed of the blend of claim 12.

* * * * *